Patented May 7, 1935

2,000,118

UNITED STATES PATENT OFFICE 2,000,118

PYROLYSIS OF HYDROCARBONS

David Binnie, Northwich, England, assignor to Imperial Chemical Industries Limited, London, England, a corporation of England No Drawing. Application November 5, 1930, Serial No. 493,698. In Great Britain November 12, 1929

2 Claims. (Cl. 260—170)

This invention relates to an improved process for the pyrolysis of hydrocarbons. More particularly, it relates to the pyrolysis of methane and its higher homologues.

It is known that when certain hydrocarbons are passed through a heated space at high space velocities acetylene, olefins, aromatic hydrocarbons, and other condensed products are formed. The particular compounds formed will, of course, depend largely upon reaction conditions, such as temperature, pressure, space velocity, and other factors. The presence of certain gases or vapors which act as diluents of methane, or other hydrocarbons undergoing pyrolysis, favor the formation of acetylene or olefins, but the use of such diluting gases has heretofore presented a serious obstacle in that it is extremely difficult to remove them from the exit gases, with the result that the acetylene or other product is contaminated thereby.

This invention has as an object to overcome the above mentioned defects of the prior art. A further object is to provide an improved process for making condensed products, such as acetylene, olefins, and aromatic hydrocarbons. It is a specific object of the invention to provide a process for making acetylene which is substantially free from diluting gases or vapors.

These objects are accomplished by the following invention which comprises a process in which hydrocarbons, such as methane, ethane, and their homologues, are passed through a tube of non-metallic refractory material at a high temperature and space velocity in admixture with, or in the presence of, a diluting vapor, such as hydrochloric acid gas or steam, which enhances the formation of acetylene or other condensed product. The essential feature of my invention is the use in the reaction zone of a gas or vapor which, at temperatures suitable for the formation of the condensed product (acetylene for example), will increase the yield of product, but can nevertheless be easily separated therefrom. In acordance with the principles of my invention, diluents containing highly electro-negative groups of elements are employed. Preferably, although not necessarily, water-soluble diluents, such as HCl gas and its equivalents, are used since these soluble compounds may be readily removed from the desired products by simple solution in water.

In the following examples I have set forth several of the preferred embodiments of my invention, but they are included only for purposes of illustration and not as a limitation.

Example 1.—A mixture of equal volumes of methane and hydrogen chloride is passed through a tube of non-metallic refractory material having a diameter of 5 mm. The tube may be constructed of a refractory capable of withstanding the extremely high temperatures involved, such as sillimanite, silica, or silicon carbide. The temperature is maintained at 1400° C. and the space velocity at 6000 volumes of the heated gas mixture per minute through unit volume of tube. The hydrogen chloride is removed from the exit gases by passing through water or any other suitable absorbing or dissolving medium. The acetylene in the exit gas after removal of the hydrogen chloride is 7.7%.

Example 2.—A mixture of equal volumes of methane and hydrogen chloride is treated as in Example 1, except that the temperature is maintained at 1450° C. and the space velocity at 9000 volumes of hot gaseous mixture per unit volume of tube per minute. The exit gas is treated as indicated in the above example for the removal of hydrogen chloride and thereafter is found to contain 7.2% of acetylene.

While I prefer to employ temperatures of 1450° C. and over, it is possible to obtain satisfactory results with temperatures as low as 1100° C. and much in excess of 1450° C.

My invention includes the use, not only of hydrochloric acid gas for the conversion of methane and other hydrocarbons into the corresponding condensed products, but in the conversion of ethane and homologues other than methane, also contemplates the use of steam for this purpose. In this latter case a volume of water vapour at least equal to, and if desired in excess of the volume of ethane (or homologue) is utilized, while a temperature somewhat lower than 1450° C., of the order of 1200° C., is preferred.

The space velocity of the gaseous mixture passed through the tube at the temperature of operation should be 1000 or over. A preferred velocity would be 6000–9000, although velocities in excess of 9000 may be employed with good results. By the term space velocity, I refer to the volume of hot gaseous mixture passed through a unit volume of tube per minute.

As many apparent and widely different embodiments of this invention may be made without departing from the spirit and scope thereof, it is to be understood that I do not limit myself to the specific embodiments thereof except as defined in the appended claims.

I claim:
1. The process of forming acetylene which com- prises passing a gas mixture consisting of equal volumes of methane and hydrochloric acid through a tube of non-metallic refractory material at a temperature of 1400–1450° C. and at a space velocity of 6000–9000.

2. The process of forming acetylene which comprises passing a gas mixture consisting of a lower aliphatic hydrocarbon gas of the class consisting of methane and ethane and a substantial proportion of gaseous hydrochloric acid as a diluent at a temperature of at least 1100° C. and at a space velocity of at least 1000.

DAVID BINNIE.